US 11,585,894 B2

(12) United States Patent
Hakobyan et al.

(10) Patent No.: US 11,585,894 B2
(45) Date of Patent: Feb. 21, 2023

(54) PROCESSING OF RADAR SIGNALS INCLUDING SUPPRESSION OF MOTION ARTIFACTS

(71) Applicant: Robert Bosch GmbH, Stuttgart (DE)

(72) Inventors: Gor Hakobyan, Stuttgart (DE); Kilian Rambach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 16/983,805

(22) Filed: Aug. 3, 2020

(65) Prior Publication Data

US 2021/0063535 A1    Mar. 4, 2021

(30) Foreign Application Priority Data

Aug. 29, 2019   (DE) .......................... 102019213009.7

(51) Int. Cl.
*G01S 13/90*     (2006.01)
*G01S 7/40*      (2006.01)
*G01S 13/931*    (2020.01)

(52) U.S. Cl.
CPC ........ *G01S 7/4052* (2013.01); *G01S 13/9021* (2019.05); *G01S 13/931* (2013.01); *G01S 7/4086* (2021.05)

(58) Field of Classification Search
CPC .. G01S 13/9021; G01S 13/931; G01S 7/4052; G01S 7/4086; G01S 7/415; G01S 7/417
See application file for complete search history.

(56) References Cited

U.S. PATENT DOCUMENTS

| | | | |
|---|---|---|---|
| 2007/0109179 A1 | 5/2007 | Werntz et al. | |
| 2016/0338599 A1* | 11/2016 | DeBusschere | ........ A61B 5/7246 |
| 2017/0254898 A1* | 9/2017 | Park | ................... G06K 7/10326 |
| 2018/0017501 A1* | 1/2018 | Trenholm | ............ G01N 21/956 |
| 2018/0339710 A1* | 11/2018 | Hashimoto | ....... B60W 30/0956 |

FOREIGN PATENT DOCUMENTS

| | | | | |
|---|---|---|---|---|
| GB | 2564648 A | 1/2019 | | |
| WO | WO-2017188905 A1 * | 11/2017 | ............. | G01S 13/53 |

* cited by examiner

*Primary Examiner* — Timothy A Brainard
(74) *Attorney, Agent, or Firm* — Norton Rose Fulbright US LLP; Gerard Messina

(57) ABSTRACT

A method for training a trainable module for evaluating radar signals. The method includes feeding actual radar signals and/or actual representations derived therefrom of a scene observed using the actual radar signals to the trainable module and conversion thereof by this trainable module to processed radar signals and/or to processed representations of the respective scene, and using a cost function to assess to what extent the processed radar signals are suited for reconstructing a movement of objects or to what extent the processed representations contain artifacts of moving objects in the scene. Parameters, which characterize the performance characteristics of a trainable module, are optimized with regard to the cost function. A method is also provided for evaluating moving objects from radar signals.

18 Claims, 4 Drawing Sheets

PROCESSING OF RADAR SIGNALS INCLUDING SUPPRESSION OF MOTION ARTIFACTS

CROSS REFERENCE

The present application claims the benefit under 35 U.S.C. § 119 of German Patent Application No. DE 102019213009.7 filed on Aug. 29, 2019, which is expressly incorporated herein by reference in its entirety.

FIELD

The present invention relates to the processing of radar signals, in particular in connection with the use of synthetic radar apertures when surroundings are observed from vehicles.

BACKGROUND INFORMATION

An at least partially automated movement of a vehicle in road traffic requires sensing the driving environment of the vehicle and initiating countermeasures if a collision with an object in the driving environment of the vehicle is imminent. Safe automated driving also requires generating a driving environment representation and localization.

Detecting objects by radar is independent of the light conditions and is even possible at a great distance without the oncoming traffic being subject to the glare of high beams. Analogously to optical images, the spatial and angular resolution is naturally diffraction-limited, however, by the interplay of the wavelength used and the physical size of the aperture from which the radar radiation emerges.

To improve resolution, UK Patent Application No. GB 2 564 648 A describes that the radar signals measured on the basis of the vehicle movement at different observation angles be combined during radar observation of the driving environment of a moving vehicle. The effect of combining the radar signals is similar to the driving environment being observed through a long aperture. For that reason, this technique is also referred to as synthetic aperture radar, SAR.

SUMMARY

In accordance with an example embodiment of the present invention, a method is provided for training a trainable module for evaluating radar signals. In this method, actual radar signals and/or actual representations derived therefrom of a scene observed using the actual radar signals are fed to the trainable module and are converted by this trainable module into processed radar signals and/or into processed representations of the respective scene.

A trainable module is regarded, in particular to be a module that embodies a function, which is parameterized using adaptable parameters and is very readily generalized. During training of a trainable module, the parameters may be adapted, in particular in such a way that, upon inputting of learning input-quantity values into the module, the corresponding learning output-quantity values are reproduced as effectively as possible. In particular, the trainable module may include an artificial neural network, ANN, and/or it may be an ANN.

A cost function is used to assess the extent to which the processed radar signals are suited for reconstructing a movement of objects or the extent to which the processed representations contain artifacts of moving objects in the scene. Parameters, which characterize the performance characteristics of the trainable module, are optimized to receive processed radar signals or processed representations, which are better assessed by the cost function. This is synonymous with the trainable module becoming more efficient at suppressing artifacts caused by moving objects in the processed radar signals or in the processed representations, as training progresses.

In this approach, there is complete flexibility with regard to the spaces, between which the trainable module performs conversion, and thus also with regard to a possible integration with the evaluation by a SAR algorithm.

For example, the trainable module may be designed for converting radar signals into processed radar signals that live in the same space of the radar signals. If these processed radar signals are better suited for reconstructing a movement of objects, then, for example, any tendency of the downstream SAR algorithm to generate motion artifacts is suppressed.

However, the trainable module may also be adapted, for example, for converting representations of the scene determined from radar signals into processed representations which live in the same space of the representations. For example, a SAR algorithm may be used to generate the representations from measured radar signals. In this manner, a suppression of motion artifacts may be tailored to the specifically used SAR algorithm.

The trainable module may also be adapted, for example, for converting radar signals directly into processed representations. In this manner, the trainable module may learn, for example, both to convert the radar signals into the searched representation of the scene, for instance, using a SAR algorithm, and to improve the suitability of the radar signals for reconstructing a movement of objects in one sequence of operation. However, the trainable module may also be pretrained, for example, already for the conversion using the SAR algorithm, for instance, and be further trained to improve motion reconstruction.

It was realized that the image quality of the representations of scenes obtained using a SAR algorithm may be improved, on the one hand, using the trainable module trained in the described manner. On the other hand, however, the quantitative accuracy of these representations is also better as moving objects appear in the representations at the correct positions and are not smeared. This improvement is effected self-consistently by the learning process.

Using the cost function, it is possible to assess the suitability for motion reconstruction or the presence of motion artifacts in accordance with any metric that may be adapted, in particular to the intended use of the processed radar signals or representations. If it is known, for example, that certain disturbances, artifacts or other features have a particularly adverse effect on an intended further processing of the radar signals or representations (using a SAR algorithm, for instance), this may be taken into consideration in the cost function by using a suitable penalty term. However, the cost function may also work using an already trained classifier, for example, which classifies radar signals on the basis of the suitability thereof for motion reconstruction or the representations on the basis of whether motion artifacts are present and, if so, to what extent. A classification of this kind is much easier to realize than, for example, a classification of the objects discernible in the representation or a semantic segmentation of the representation according to object types.

The parameters may be optimized using any algorithm, such as a gradient descent method, for example. Alternatively or also in combination therewith, however, a fixed grid search may also be performed on a search space defined by a plurality of parameters, for example. Such a search is not dependent on the cost function being continuous. Various optimization methods may be performed simultaneously or also alternatingly, for example.

In an especially advantageous embodiment, the cost function includes a GAN term which assumes all the better values, the more indistinguishable the processed radar signals or the processed representations are from a predetermined set of reference radar signals or from a predetermined set of reference representations, in accordance with a discriminator module. The discriminator module is thereby additionally trained to distinguish the processed radar signals or the processed representations from the reference radar signals or from the reference representations.

In this embodiment, the trainable module functions as generator G in a conditional generative adversarial network, abbreviated as "conditional GAN." As input, this generator G receives radar signals or representations x as well as, optionally, samples z drawn from a (for example, normally distributed) multidimensional random variable and attempts to generate radar signals or representations y' processed therefrom which are preferably indistinguishable from the reference radar signals or reference representations, y. In this context, "conditional" signifies that generator G maps input x (optionally including samples z) to an output $G(x,z)=:y'$, which relates to the same scene. Thus, instead of making an effort just to provide any result in the target space having as few as possible motion artifacts, for example, a representation having a plurality of moving and, therefore, smeared objects, no conversion into a representation is performed in which these objects have completely disappeared. Discriminator module D is only needed during the training and is no longer used in actual operation in the later processing of radar signals or representations.

The GAN term may assume the following form $L_{cGAN}(G, D)$, for example:

$$L_{cGAN}(G,D)=E_{x,y}[\log D(x,y)]+E_{x,z}[\log(1-D(x,G(x,z)))].$$

Here, $E_{x,y}$ denotes the expected value (sample mean) over pairs of x and y. Correspondingly, $E_{x,z}$ denotes the expected value over pairs of x and z. Generator G endeavors to minimize $L_{cGAN}(G,D)$, while discriminator D endeavors to maximize $L_{cGAN}(G,D)$. Optimal generator G* is then the solution to the optimization problem $$G^* = \operatorname*{argmin}_G \operatorname*{max}_D L_{cGAN}(G, D).$$

$$\operatorname*{max}_D$$

thereby denotes the maximization of $L_{cGAN}(G, D)$ over the parameters of discriminator D. Correspondingly, $$\operatorname*{argmin}_G$$

denotes the minimization over the parameters of generator G.

In another especially advantageous embodiment, the cost function additionally includes a similarity term, which assumes all the better values, the more similar the processed radar signals or the processed representations are in accordance with a predefined metric for the reference radar signals or the reference representations. This more forcefully counteracts a possible tendency of the generator to seek "simple ways" to eliminate motion artifacts which are not expedient in terms of the intended application. If, for example, most reference radar signals or reference representations relate to scenes in which moving vehicles are discernible, then the attempt of the generator to surreptitiously obtain a better value of $L_{cGAN}(G,D)$ by allowing all vehicles to disappear is thwarted by the similarity term. An example of a similarity term is $$L_{L1}(G)=E_{x,y,z}[\|y-G(x,z)\|_1].$$

Here, any other metric may fundamentally be used as the L1 metric.

In another especially advantageous embodiment, the cost function additionally includes an application term, which measures desirable properties of the processed radar signals or of the processed representations, as such for the intended application. This application term is also referred to as "perceptual loss" $L_P(G)$. The application term is not limited to having to be dependent only on the final result of the conversion. Rather, it may also be dependent, for example, on intermediate results of the conversion. If the generator includes a multilayer neural network, for instance, then the intermediate results may also be inferred from the hidden layers between the input layer and the output layer.

The application term is able measure, for example, whether the scene represented by the processed radar signals or by the processed representations, is plausible in the sense of the specific application. Thus, for example, a representation is discarded where an automobile is three times as high or wide as usual or is moving in the inner city at approximately the speed of sound. Alternatively or in combination therewith, for example, a comparison with reference radar signals or reference representations on an abstract plane may also reside in the application term. Thus, for example, a representation generated by an autoencoder or another ANN from the processed radar signals or the processed representation may be compared to the representations which generate the same ANN from reference radar signals or reference representations.

Using the similarity term and the application term, the optimization problem may be written altogether, for example, as $$G^* = \operatorname*{argmin}_G \operatorname*{max}_D L_{cGAN}(G, D) + \lambda L_{L1}(G) + \gamma L_P(G).$$

Here, $\lambda$ and $\gamma$ are hyperparameters that weight the various cost function terms.

In another especially advantageous embodiment, the reference radar signals or the reference representations are ascertained from measured radar signals. The actual radar signals or the actual representations, are ascertained from an information-reduced version of the measured radar signals. This ensures, first of all, that the actual radar signals or the actual representations, on the one hand, and the reference radar signals or reference representations, on the other hand, refer to identical scenes in each case. On the other hand, it is possible to selectively enhance the ability of the trainable module to compensate for certain mechanisms to be expected in the respective application that conceal the information content in the radar signals or representations.

Radar sensors for vehicles that have many channels in the plane of vehicle movement (thus, for instance, in the direction of movement), for example, are relatively expensive. It is, therefore, preferable to be able to manage with fewer channels or even with only one channel for the radar-based, driving-environment observation version that is ultimately to be series produced. On the other hand, to receive actual radar signals, a radar sensor having many channels may be used since it is only necessary to equip a few vehicles therewith.

For that reason, the radar signals are advantageously measured using a radar sensor that is mounted on a vehicle and has a plurality of channels in a configuration which is not oriented exclusively orthogonally to the vehicle movement. From this, in particular reference representations of the scene may be derived in which moving objects are correctly placed and are substantially free of motion artifacts. Furthermore, the velocity of the moving objects may also be determined from these data. The information-reduced version of the measured radar signals may then be produced, for example, by masking at least one channel.

Another especially advantageous embodiment provides that another generator module be additionally trained to reconvert reference radar signals or reference representations into radar signals or representations of the type of actual radar signals or actual representations. This means that the reconverted radar signals or representations live in the space of the actual radar signals or actual representations. The cost function then additionally includes an inverse GAN term. This inverse GAN term assumes all the better values the more indistinguishable the reconverted radar signals or representations are from the actual radar signals or the actual representations, in accordance with another discriminator module.

The further discriminator module is trained to distinguish the reconverted radar signals or representations from the actual radar signals or actual representations. In addition, the cost function also includes a consistency term. This consistency term is a measure of the extent to which actual radar signals or actual representations are identically reproduced in the case of conversion by the trainable module and reconversion by the further generator module.

In a training of this type, the architecture in which the trainable module is integrated in the function as a generator, is extended from a "conditional GAN" to a CycleGAN. The essential advantage is that it is no longer necessary that the reference radar signals or reference representations relate to the same scenes as the actual radar signals or actual representations. The major advantage of CycleGANs is that they are able to convert data between domains, which are each characterized by unpaired sets of examples.

This may significantly simplify training and reduce the cost thereof. In the previously described example, in which the trainable module is trained on the basis of actual radar signals or actual representations having a lower information content, on the one hand, and reference radar signals or reference representations having a higher information content, on the other hand, a training is even possible without the radar sensor, which has a plurality of channels and is used to determine the reference radar signals or the reference representations in a configuration which is not oriented exclusively orthogonal to the vehicle movement. Instead, for example, the reference radar signals or the reference representations may be externally obtained and only the actual radar signals and actual representations be based on one's own measurements.

Also facilitated, in particular is subsequently changing the radar sensor to be used in series. It suffices to use the new radar sensor to pick up new actual radar signals and possibly ascertain new actual representations therefrom. On the other hand, the reference radar signals and reference representations used up until that point may continue to be used.

The CycleGAN learns how the "conditional GAN," and performs a mapping G of space X, in which the actual radar signals or actual representations x live, into space Y, in which the reference radar signals or reference representations y live. Also learned is the reverse mapping F from space Y to space X. A first discriminator $D_x$ is trained which attempts to differentiate between generated data F(y) and real radar signals or representations x. A second discriminator Dy is trained, which attempts to differentiate between generated data G(x) and real reference radar signals or reference representations y. This may be expressed in the cost function terms, for example, $$L_{GAN}(G,D_y,X,Y,Z_1)=E_y[\log D_y(x)]+E_{x,z_1}[\log(1-D_y(G(x,z_1)))] \text{ and}$$

$$L_{GAN}(F,D_x,Y,X,Z_2)=E_x[\log D_x(x)]+E_{y,z_2}[\log(1-D_x(F(y,z_2)))].$$

Here, $z_1$ and $z_2$ are samples of random variables $Z_1$ and $Z_2$. The use of random variables $Z_1$ and $Z_2$ is optional.

An exemplary consistency term G(F(y))≈y, which monitors observance of consistency conditions F(G(x))≈x, is $$L_{cyc}(G,F,X,Y,Z_1,Z_2)=E_{x,z_1,z_2}[\|F(G(x,z_1),z_2)-x\|_1]+E_{y,z_1,z_2}[\|G(R_y,z_2),z_1)-y\|_1].$$

The entire cost function for the CycleGAN may then be written, for example, as $$L_{cycleGAN}(G,F,D_x,D_y)=L_{GAN}(G,D_y,X,Y,Z_1)+L_{GAN}(F,D_x,Y,X,Z_2)+\lambda L_{cyc}.$$

This cost function may also be extended analogously to the "conditional GAN" (cGAN) by an application term $L_P$, which, at this stage, depends both on G as well as on F: $L_P=L(G,F)$. This term may be added to weight γ, for example.

The similarity terms may likewise be added to the cost function for the CycleGAN. In contrast to the cGAN, there are two terms at this stage for the two generators G and F:

$$L_{L1}(G)=E_{x,y}[\|y-G(x)\|_1] \text{ and}$$

$$L_1(F)=E_{x,y}[\|x-F(y)\|_1].$$

These terms may be added to weight μ, for example.

In another especially advantageous embodiment, hyperparameters, which define the relative weighting of terms in the cost function among themselves, are optimized in accordance with a predefined optimization criterion. These hyperparameters represent further degrees of freedom which may be used to adapt the trainable module to the specific task. For example, a predefined grid may be used to search a search space defined by a plurality of hyperparameters. This does not require that the optimization criterion depend continuously on the hyperparameters.

As previously already introduced into the formulae, in another especially advantageous embodiment, at least one actual radar signal includes both a measured radar signal as well as a sample drawn from a random variable. The sample may be added to the measured radar signal, for example. The random variable may, in particular be multidimensional and normally distributed, for example. Noise added in this manner has a double effect: On the one hand, many further variants may be generated from a predetermined supply of actual radar signals or of actual representations generated therefrom, to enhance the variability of the training. On the other hand, other features in the latent space may also be learned.

In another especially advantageous example embodiment, the trainable module is additionally trained to determine processed representations, which contain spatially resolved information about the velocity of objects included in the processed representations. If the processed representation is in the form of an image, for example, then this image may be extended by an additional channel (analogous to a color channel), for example, which, for each pixel, contains the velocity information of the object to which the pixel belongs. Here, in a coordinate system centered on the radar sensor, the velocity information is the radial component of the absolute velocity of the object. The velocity information may be used, for example, to examine the question of whether one's own vehicle (the ego vehicle), from which the surroundings are observed, must change the performance characteristics thereof to avoid a collision with other moving objects.

In another especially advantageous embodiment, a trainable module is selected that has an artificial neural network, ANN, which is built in layers. Here, the number of neurons and/or of other processing units per layer decreases monotonically in a first layer sequence and increases monotonically in a second layer sequence. This forms a "bottleneck" between the end of the first layer sequence and the beginning of the second layer sequence, in which there is an intermediate result having a dimensionality that is significantly reduced in comparison to the input radar signals or the input representation of the scene. This "bottleneck" allows the ANN to learn and compress relevant features. This makes it possible to achieve a better performance and reduce computational outlay.

In another especially advantageous embodiment, the ANN features at least one direct connection between a first layer from the first layer sequence and a second layer from the second layer sequence. In this manner, certain information may be selectively directed past the mentioned "bottle neck," thereby altogether increasing the information content in the processed radar signals or in the processed representation. A direct connection is thus understood in particular to be a connection that bypasses at least one layer from the first and/or second layer sequence that would otherwise have to be traversed.

Once the trainable module has been trained, the final state is in the parameter set having the parameters that characterize the performance characteristics thereof. In the case of an ANN, these parameters may include weights, for example, which are used to compute the inputs fed to a neuron or some other processing unit to activate this neuron or this processing unit. This parameter set makes it possible to readily reproduce the trainable module as needed without any further training and is, therefore, a product that may be sold separately.

The present invention also provides a method for evaluating moving objects from radar signals. In this method, a processed representation of the scene observed using the radar signals is determined using a trainable module that was trained as described above. A second representation of the scene observed using the radar signals is determined here from the input fed to the trained module. Spatially resolved information about the velocity of objects included in the representations is determined from the difference between the processed representation and the second representation. This task may be undertaken, in particular by another trained generator.

The consideration behind this is that suppressing motion artifacts requires knowledge of the underlying movement, and it is thus possible to reconstruct the movement from the work product of this suppression.

As explained above, reacting appropriately to objects recognized in the driving environment of a vehicle constitutes an essential application of modules trained using the method described at the outset for the purposes of a driving assistance system as well as of at least partially automated driving. For that reason, the present invention relates to another method.

In this method, a trainable module is first trained using the method described at the outset. Radar signals from the driving environment of the vehicle are measured using at least one radar sensor mounted on a vehicle. At least one control signal is generated from the result of the evaluation. The vehicle is controlled by the control signal.

In this case, the generation of the control signal may include, in particular a check whether, on the basis of the result of the evaluation in conjunction with the current or planned trajectory of one's own vehicle, there is reason to suspect that the trajectory of an object in the driving environment of one's own vehicle intersects this current or planned trajectory of one's own vehicle. If this is the case, the control signal may, in particular be directed at modifying the trajectory of one's own vehicle in such a way that it is no longer intersected by the trajectory of the detected object.

The methods may, in particular be completely or partially computer-implemented. Thus, the present invention also relates to a computer program having machine-readable instructions which, when executed on one or a plurality of computer(s), prompt the computer(s) to execute one of the described methods.

Also to be regarded as computers in this sense are control devices for vehicles and embedded systems for technical devices, which are likewise capable of executing machine-readable instructions.

The present invention also relates to a machine-readable data carrier and/or to a download product having the parameter set and/or the computer program. A download product is a digital product that may be transmitted over a data network, i.e. downloaded by a user thereof, and offered for immediate download in an online shop, for example.

Furthermore, a computer may be equipped with the parameter set, computer program, the machine-readable data carrier or with the download product.

With reference to the figures, other refinements of the present invention are explained in greater detail below, along with the description of preferred exemplary embodiments of the present invention.

DETAILED DESCRIPTION OF EXAMPLE EMBODIMENTS

Figure 1:
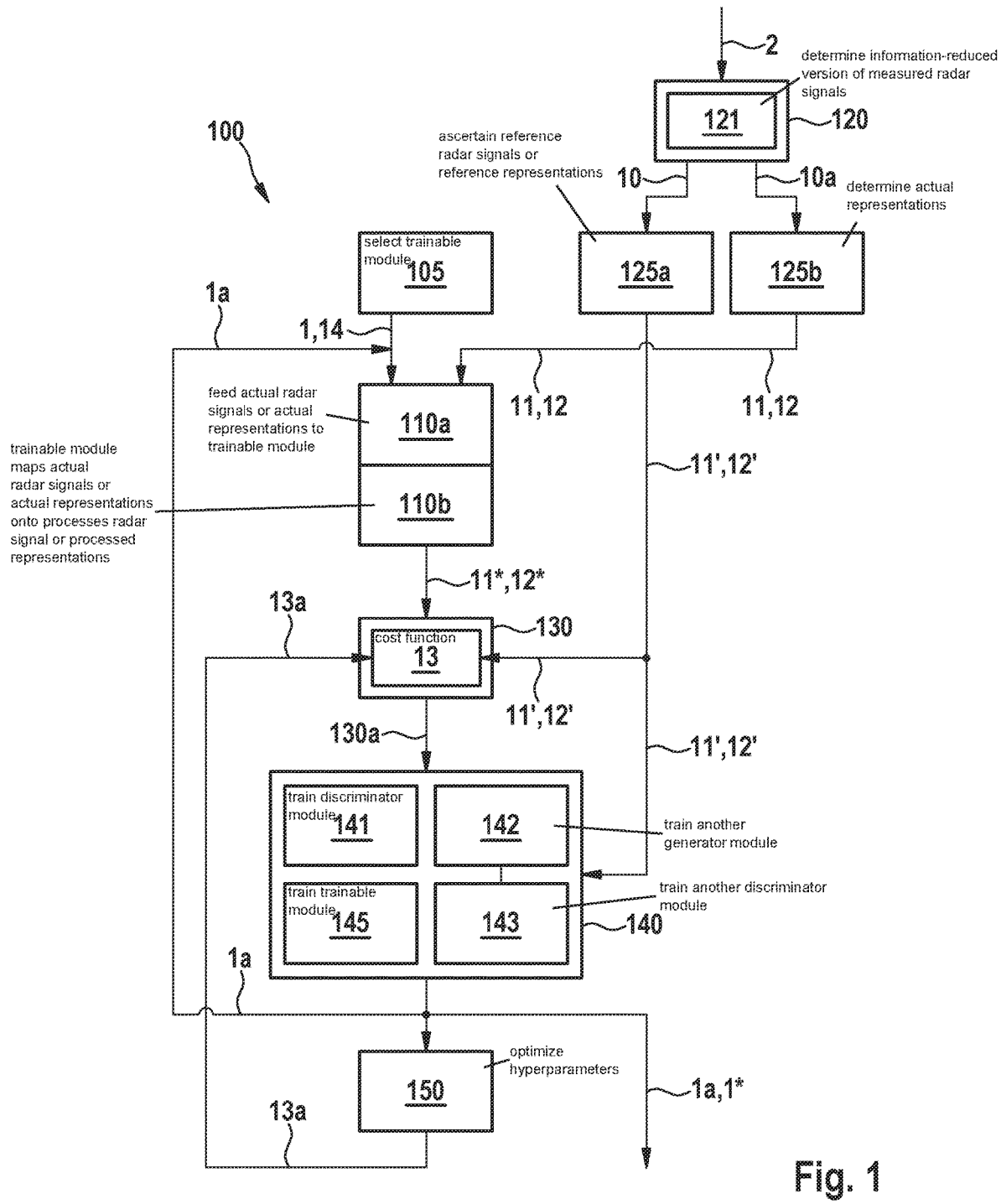
FIG. 1 shows an exemplary embodiment of training method 100.

FIG. 1 is a flow chart of an exemplary embodiment of training method 100. In step 105, a trainable module 1 that includes an ANN 14 having an encoder-decoder architecture ("U-Net") is selected for training. This ANN 14 is shown in greater detail in FIG. 3.

A scene 2 is observed by radar in step 120. Radar signals 10 are measured by a radar sensor 51 that has a plurality of channels 51a-51c. In accordance with block 121, an information-reduced version 10a of measured radar signals 10 is determined by masking at least one of channels 51a-51c.

Actual radar signals 11 and/or actual representations 12 of observed scene 2 are determined from this information-reduced version 10a. Actual radar signals 11 or actual representations 12 are fed to trainable module 1 in step 110a. In step 110b, trainable module 1 maps actual radar signals 11 or actual representations 12 onto processed radar signals 11* or onto processed representations 12*. The aim of this processing is to improve the suitability of the actual radar signals for the motion reconstruction of objects or to reduce motion artifacts in actual representations.

On the basis of a cost function 13, step 130 assesses the extent to which processed radar signals 11* are suited for reconstructing a movement 21a of objects 21 or the extent to which motion artifacts are actually reduced in processed representations 12*. For this purpose, the cost function compares processed radar signals 11* or processed representations 12* to reference radar signals 11' or reference representations 12'. In the example shown in FIG. 1, step 125a ascertains reference radar signals 11' or reference representations 12' from measured radar signals 10, from whose information-reduced version 10a, actual radar signals 11 or actual representations 12, were determined (step 125b).

Assessment 130a by the cost function is used in step 140 to optimize parameters 1a that characterize the performance characteristics of trainable module 1. This optimization aims to improve assessment 130a of received, processed radar signals 11* or of received, processed representations 12* by cost function 13 in the case of continued processing of actual radar signals 11 or of actual representations 12 by trainable module 1. When this optimization is concluded in accordance with a predetermined termination criterion, the then obtained values of parameters 1a characterize the performance characteristics of trainable module 1 in fully trained state 1*.

In addition, in step 150, hyperparameters 13a, which define the relative weighting of terms in cost function 13 among themselves, may also be optimized. Whether this optimization takes place before, during or after optimization 140 of parameters 1a may thereby be freely chosen.

A few exemplary optimization options are denoted inside of box 140.

Thus, in accordance with block 141, a discriminator module may be trained to differentiate processed radar signals 11* or processed representations 12* from reference radar signals 11' or from reference representations 12'. Together with trainable module 1, the discriminator module then forms a "conditional generative adversarial network," cGAN.

In accordance with block 142, it is possible to train another generator module which operates in the exact opposite direction as trainable module 1 that is actually to be trained. Then, in accordance with block 143, another discriminator module may be trained to differentiate the radar signals or representations supplied by this additional generator module from actual radar signals 11 or actual representations 12. In this manner, the cGAN is extended to a CycleGAN. A CycleGAN is no longer dependent on actual radar signals 11 or actual representations 12 relating to same scenes 2 as reference radar signals 11' or reference representations 12'. Reference radar signals 11' or reference representations 12' from any source may then be used.

Figure 2:
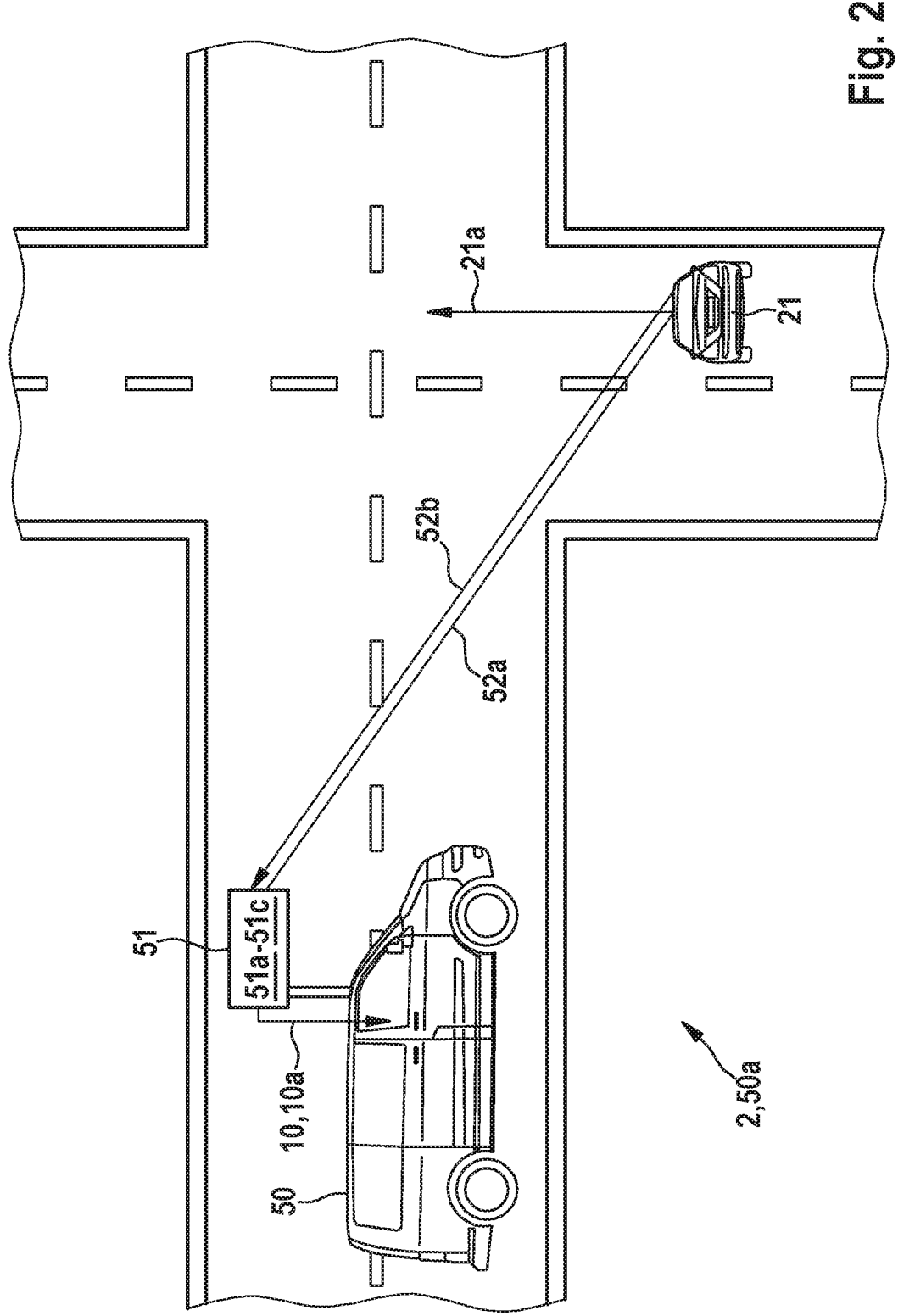
FIG. 2 shows an exemplary scene 2 that is to be evaluated by trainable module 1.

FIG. 2 shows exemplarily a scene 2 in driving environment 50a of a vehicle 50. Trainable module 1 is trained using method 100 to evaluate scenes 2 of this type. Vehicle 50 is equipped with a radar sensor 51 that has a plurality of channels 51a-51c in the driving direction of vehicle 50. Each channel 51a-51c is equipped with an independent receiving unit. This means that equipping radar sensor 51 with a plurality of channels 51a-51c increases the hardware costs correspondingly. The aim, therefore, is to manage in active operation with as few channels 51a-51c as possible or even with only one channel 51a-51c.

Scene 2 is observed by emitting signals 52a and analyzing signals 52b that are reflected by objects 21. In addition to the positions, of particular importance here are also velocities 21a of objects 21 since these velocities 21a are also crucial in determining whether vehicle 50 must alter the performance characteristics thereof to avoid a collision.

A radar measurement always measures the velocity component which is directed radially at radar sensor 51 or away therefrom. This component is small in the situation shown in FIG. 2. The movement prediction of object 21 is significantly improved by trained module 1 being able to more precisely determine this small component.

Figure 3:
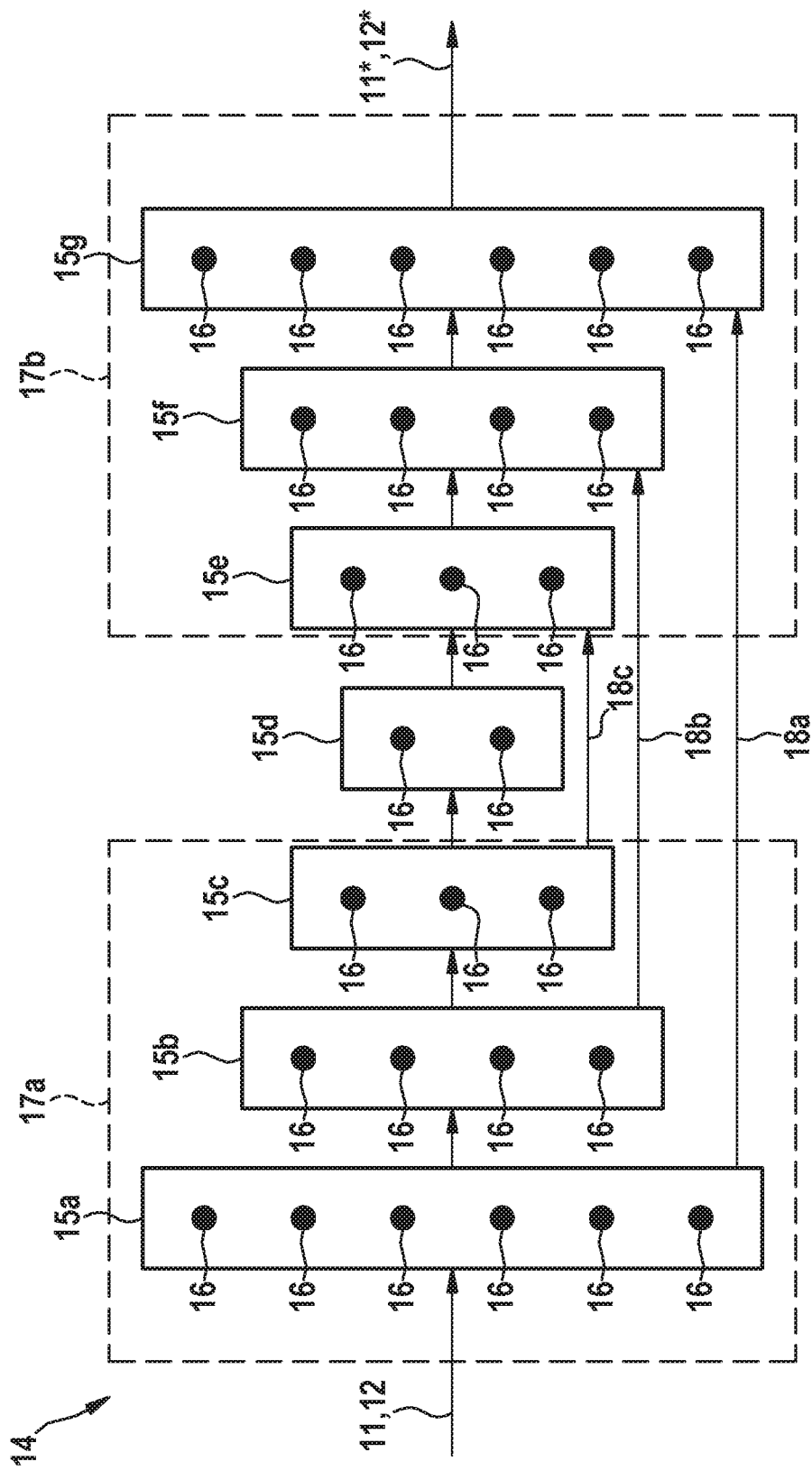
FIG. 3 shows an exemplary neural network 14 for use in trainable module 1.

FIG. 3 schematically shows an exemplary ANN 14 which may be used in trainable module 1. In this example, ANN 14 is composed of seven layers 15a-15g, which each include neurons or other processing units 16. Layers 15a-15c thereby form a first layer sequence 17a in which the number of neurons 16 per layer 15a-15c decreases monotonically. Layers 15e-15g form a second layer sequence 17b in which the number of neurons 16 per layer 15e-15g increases monotonically. Situated therebetween is layer 15d, in which resides a maximally compressed representation of actual radar signals 11 or of actual representations 12. ANN 14 additionally includes three direct connections 18a-18c between layers 15a-15c from first layer sequence 17a and layers 15e-15g from second layer sequence 17b, which, in the example shown in FIG. 3, each have equal numbers of neurons 16.

Figure 4:
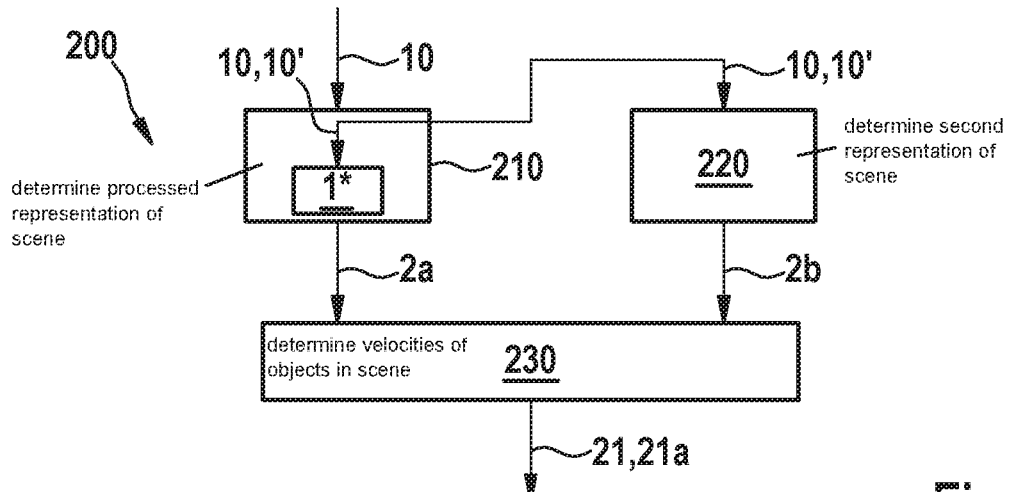
FIG. 4 shows an exemplary embodiment of method 200 for evaluating radar signals 10.

FIG. 4 is a flow chart of a special method 200 for evaluating radar signals 10. Using a module 1* trained in accordance with method 100, step 210 of this method determines a processed representation 2a of scene 2, which is observed using radar signals 10, from radar signals 10 and/or from a representation 10' of scene 2 generated therefrom. In this processed representation 2a, trained module 1* reduces the motion artifacts. Step 220 determines a second representation 2b of scene 2 from the input fed to trained module 1*, in which the motion artifacts are not reduced.

For example, in step 210, trained module 1* is able to initially improve the suitability of radar signals 10 for a motion reconstruction, so that, on the basis thereof, processed representation 2a having reduced motion artifacts may be obtained using a SAR algorithm. In step 220, the same SAR algorithm may then be applied to original radar signals 10 to obtain a second representation 2b without correcting the motion artifacts.

However, the SAR algorithm may also be applied directly to radar signals 10, for example, to obtain a representation 10' of scene 2. From this representation 10', step 210 may then use trained module 1\* to obtain processed representation 2a having reduced motion artifacts. In step 220, representation 10' may be passed through, unchanged, to obtain representation 2b without correcting the motion artifacts.

In step 230, velocities 21a of objects 21 in scene 2 are determined from the comparison of representations 2a and 2b. Another generator in the form of a cGAN may be used for this, for example.

Figure 5:
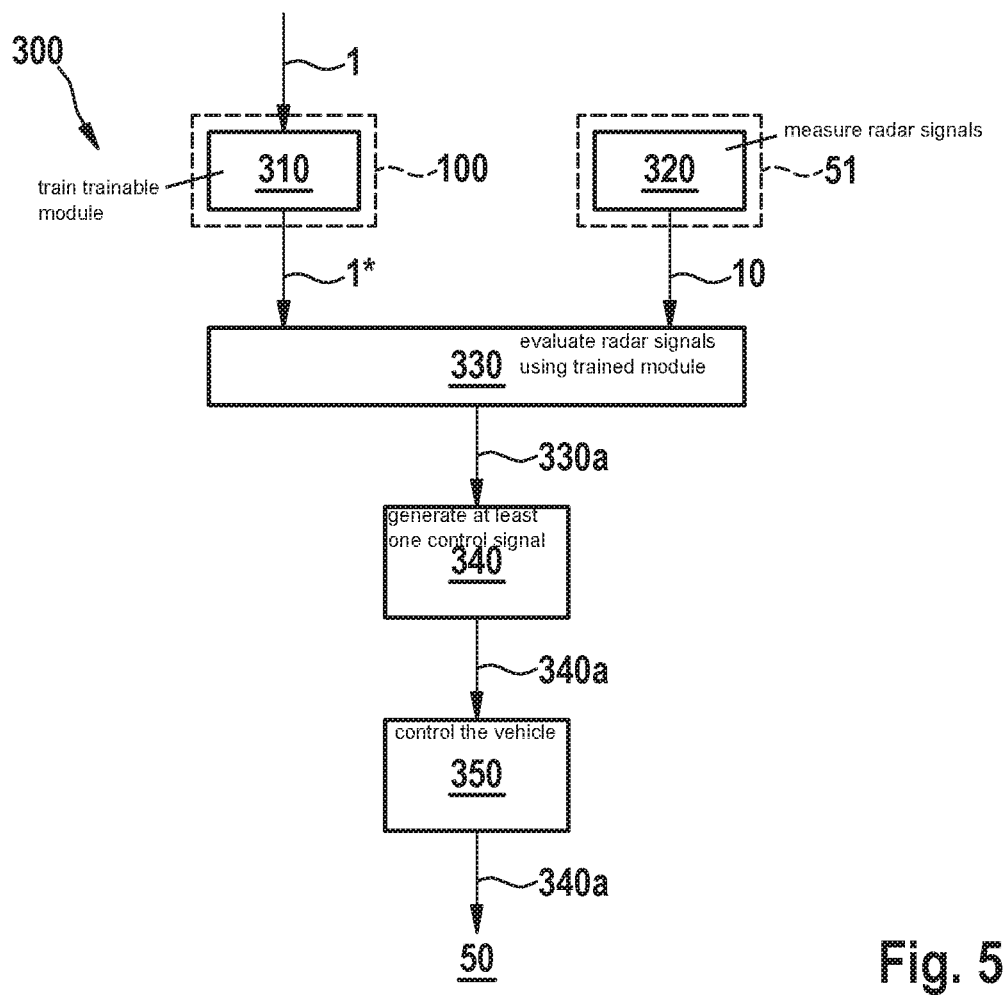
FIG. 5 shows an exemplary embodiment of method 300 including the complete active chain up until control of vehicle 50.

FIG. 5 is a flow chart of an exemplary embodiment of method 300 that includes the complete active chain from the measurement of radar signals 10 until control of vehicle 50.

In step 310 of method 300, a trainable module 1 is trained using method 100. In step 320, radar signals 10 are measured by a radar sensor 51. In step 330, these radar signals 10 are evaluated by trained module 1\*.

From result 330a of evaluation 330, a control signal 340a is determined in step 340. In step 350, vehicle 50 is controlled by this control signal 340a. In particular, control signal 340a may be such that, when used to control vehicle 50, the trajectory thereof is changed in a way that avoids a collision with objects detected in driving environment 50a of vehicle 50.

What is claimed is:

1. A method for training a trainable module for evaluating radar signals, comprising the following steps:
   training the training module by:
   feeding actual radar signals of a scene and/or actual representations derived from the actual radar signals of the scene, to the trainable module;
   converting, by the trainable module, the actual radar signals and/or the actual representations, to: (i) processed radar signals of the scene and/or (ii) processed representations of the scene, wherein the processed radar signals and/or the processed representations have reduced motion artifacts relative to the actual radar signals and/or the actual representations;
   using a cost function to assess to what extent the processed radar signals and/or the processed representations contain artifacts of moving objects in the scene; and
   optimizing parameters of the trainable module, which characterize performance characteristics of the trainable module, the optimizing being based on the assessment of the cost function, and the parameters of the trainable module being optimized in such a manner than the trainable module becomes more efficient at suppressing artifacts caused by moving objects in the processed radar signals and/or in the processed representations, as the training progresses.

2. The method as recited in claim 1, wherein:
   the cost function includes a GAN term which assumes better values to lower a cost assessed by the cost function, the more indistinguishable the processed radar signals or the processed representations are from a predetermined set of reference radar signals or from a predetermined set of reference representations in accordance with a discriminator module; and
   the discriminator module is trained to differentiate the processed radar signals or the processed representations from the reference radar signals or from the reference representations.

3. The method as recited in claim 2, wherein the cost function additionally include a similarity term which assumes better values to lower the cost assessed by the cost function the more similar the processed radar signals or the processed representations are in accordance with a predefined metric for the reference radar signals or the reference representations.

4. The method as recited in claim 2, the cost function additionally includes an application term which measures desirable properties of the processed radar signals or of the processed representations, for an intended application.

5. The method as recited in claim 2, the reference radar signals or the reference representations are determined from measured radar signals, and the actual radar signals or the actual representations are determined from an information-reduced version of the measured radar signals.

6. The method as recited in claim 5, wherein the measured radar signals are measured using a radar sensor that is mounted on a vehicle and has a plurality of channels in a configuration which is not oriented exclusively orthogonally to the vehicle movement.

7. The method as recited in claim 6, wherein the information-reduced version of the measured radar signals is produced by masking at least one channel.

8. The method as recited in claim 2, wherein hyperparameters which define a relative weighting of terms in the cost function among themselves, are optimized in accordance with a predefined optimization criterion.

9. The method as recited in claim 1, wherein at least one of the actual radar signals includes both a measured radar signal as well as a sample drawn from a random variable.

10. The method as recited in claim 1, wherein the trainable module additionally is trained to determine processed representations containing spatially resolved information about a velocity of objects included in the processed representations.

11. The method as recited in claim 1, wherein the trainable module includes an artificial neural network (ANN) which is built in layers, a number of neurons and/or of other processing units per layer decreasing monotonically in a first layer sequence and increasing monotonically in a second layer sequence.

12. The method as recited in claim 11, wherein the ANN has at least one direct connection between a first layer from the first layer sequence and a second layer from the second layer sequence.

13. The method as recited in claim 1, further comprising the following step:
   obtaining a set of parameters which characterizes performance characteristics of the trainable module.

14. A method for training a trainable module for evaluating radar signals, the method comprising the following steps:
   feeding actual radar signals of a scene and/or actual representations derived from the actual radar signals of the scene, to the trainable module;
   converting, by the trainable module, the actual radar signals and/or the actual representations, to: (i) processed radar signals of the scene and/or (ii) processed representations of the scene;
   using a cost function to assess to what extent the processed radar signals are suited for reconstructing a movement of objects or to what extent the processed representations contain artifacts of moving objects in the scene; and optimizing parameters of the trainable module, which characterize performance characteristics of the trainable module, wherein the optimizing is based on the assessment of the cost function, and the parameters are optimized in such a way that the trainable module becomes more efficient at suppressing artifacts caused by moving objects in the processed radar signals and/or or the processed representation, as the training progresses;

wherein:

the cost function includes a GAN term which assumes better values to lower a cost assessed by the cost function, the more indistinguishable the processed radar signals or the processed representations are from a predetermined set of reference radar signals or from a predetermined set of reference representations in accordance with a discriminator module; and the discriminator module is trained to differentiate the processed radar signals or the processed representations from the reference radar signals or from the reference representations;

a generator module is trained to reconvert reference radar signals or reconvert reference representations into radar signals or representations of a type of the actual radar signals or the actual representations, the cost function additionally including an inverse GAN term which assumes better values to lower the cost assessed by the cost function, the more indistinguishable the reconverted radar signals or representations are from the actual radar signals or the actual representations, in accordance with a further discriminator module;

the further discriminator module is trained to distinguish the reconverted radar signals or reconverted representations from the actual radar signals or from the actual representations; and the cost function includes a consistency term, which is a measure of an extent to which the actual radar signals or the actual representations are identically reproduced in the case of conversion by the trainable module and reconversion by the generator module.

15. A method for evaluating moving objects from radar signals, comprising the following steps:

determining a first processed representation of a first scene observed using radar signals, using a trainable module trained by:

feeding actual radar signals of a second scene and/or actual representations derived from the actual radar signals of the second scene, to the trainable module;

converting, by the trainable module, the actual radar signals and/or the actual representations to: (i) processed radar signals of the scene and/or (ii) processed representations of the scene, using a cost function to assess to what extent the processed radar signals are suited for reconstructing a movement of objects or to what extent the processed representations contain artifacts of moving objects in the scene, and optimizing parameters of the trainable module, which characterize performance characteristics of the trainable module, wherein the optimizing is based on the assessment of the cost function, and the parameters are optimized in such a way that the trainable module becomes more efficient at suppressing artifacts caused by moving objects in the processed radar signals and/or or the processed representation, as the training progresses;

determining a second representation of the first scene observed using the radar signals from input fed to the trained module; and determining spatially resolved information about a velocity of objects included in the first processed representation and the second representation from a difference between the first processed representation and the second representation.

16. A method, comprising the following steps:

training a trainable module by:

feeding actual radar signals of a scene and/or actual representations derived from the actual radar signals of the scene, to the trainable module, converting, by the trainable module, the actual radar signals and/or the actual representations to: (i) processed radar signals of the scene and/or (ii) processed representations of the scene, wherein the processed radar signals and/or the processed representations have reduced motion artifacts relative to the actual radar signals and/or the actual representations, using a cost function to assess to what extent the processed radar signals and/or the processed representations contain artifacts of moving objects in the scene, and optimizing parameters of the trainable module, which characterize performance characteristics of the trainable module, the optimizing being based on the assessment of the cost function, and the parameters of the trainable module being optimized in such a manner than the trainable module becomes more efficient at suppressing artifacts caused by moving objects in the processed radar signals and/or in the processed representations, as the training progresses;

measuring radar signals from a driving environment of a vehicle using at least one radar sensor mounted on a vehicle;

evaluating the radar signals using the trained module;

generating at least one control signal from a result of the evaluating; and controlling the vehicle using the control signal.

17. A non-transitory machine-readable data carrier on which is stored a computer program for training a trainable module for evaluating radar signals, the computer program, when executed by a computer, causing the computer to perform the following steps:

training the trainable module by:

feeding actual radar signals of a scene and/or actual representations derived from the actual radar signals of the scene, to the trainable module;

converting, by the trainable module, the actual radar signals and/or the actual representations, to: (i) processed radar signals of the scene and/or (ii) processed representations of the scene, wherein the processed radar signals and/or the processed representations have reduced motion artifacts relative to the actual radar signals and/or the actual representations;

using a cost function to assess to what extent the processed radar signals and/or the processed representations contain artifacts of moving objects in the scene; and optimizing parameters of the trainable module, which characterize performance characteristics of the trainable module, the optimizing being based on the assessment of the cost function, and the parameters of the trainable module being optimized in such a manner than the trainable module becomes more efficient at suppressing artifacts caused by moving objects in the processed radar signals and/or in the processed representations, as the training progresses.

18. A computer configured to train a trainable module for evaluating radar signals, the computer configured to:
train the trainable module, wherein to train the trainable module, the computer is configured to:
feed actual radar signals of a scene and/or actual representations derived from the actual radar signals of the scene observed to the trainable module, the trainable module converting the actual radar signals and/or the actual representations to: (i) processed radar signals of the scene and/or (ii) processed representations of the scene, wherein the processed radar signals and/or the processed representations have reduced motion artifacts relative to the actual radar signals and/or the actual representations;
use a cost function to assess to what extent the processed radar signals and/or the processed representations contain artifacts of moving objects in the scene; and
optimize parameters of the trainable module, which characterize performance characteristics of the trainable module, the optimizing being based on the assessment of the cost function, and the parameters of the trainable module being optimized in such a manner than the trainable module becomes more efficient at suppressing artifacts caused by moving objects in the processed radar signals and/or in the processed representations, as the training progresses.

\* \* \* \* \*